United States Patent [19]
Maack

[11] Patent Number: 5,184,433
[45] Date of Patent: Feb. 9, 1993

[54] FIBER OPTIC POLISHER

[75] Inventor: David R. Maack, Mendon, Mass.

[73] Assignee: Aster Corporation, Milford, Mass.

[21] Appl. No.: 494,965

[22] Filed: Mar. 16, 1990

[51] Int. Cl.⁵ ............................................. B24B 13/00
[52] U.S. Cl. .................................. 51/283 R; 51/57; 51/60; 51/119
[58] Field of Search ............. 51/283 R, 282 E, 284 R, 51/284 E, 57, 58, 59 SS, 60, 62, 67, 119, 120

[56] References Cited

U.S. PATENT DOCUMENTS

| | | | |
|---|---|---|---|
| 4,291,502 | 9/1981 | Grimsby et al. | 51/120 |
| 4,384,431 | 5/1983 | Jackson | 51/283 R |
| 4,831,784 | 5/1989 | Takahashi | 51/119 |
| 4,979,334 | 12/1990 | Takahashi | 51/119 |

FOREIGN PATENT DOCUMENTS 2429648  2/1980  France ................... 51/120

OTHER PUBLICATIONS

Buehler Fibrpol Polisher FPN, Dec. 1989, p. 50.
Buehler Fibrpol PC, FPN, Dec. 1989, p. 52.
Instruction Manual for Fiber Polisher Model OFL-1B, Seiko Instruments and Electronics, Ltd.
Instruction manual entitled "Assembly Instructions for RMS (Rotary Mechanical Splice) Single-mode and Multi-mode", p. 13.

Primary Examiner—Robert A. Rose
Attorney, Agent, or Firm—Fish & Richardson

[57] ABSTRACT

A method and apparatus of polishing the end of an optical fiber that produces relative lateral movement between the end of the fiber and an abrasive surface while changing the angle of attack of the relative movement at a rate greater than about 10,000 arc degrees per second.

32 Claims, 6 Drawing Sheets

FIBER OPTIC POLISHER

This invention relates to the polishing of optical fibers and fiber optic connectors.

BACKGROUND OF THE INVENTION

The interconnection of optical fibers of the type used in communication of data, voice, etc. requires that the ends of the fibers be finely polished to avoid transmission losses at the interconnection due to injection loss because of surface imperfections, misalignment or the like, or due to back reflection. It is known to perform such polishing by placing the end of the fiber and a surrounding ferrule against an abrasive surface and either move the fiber, the abrasive or both to form a finished end. Typically, the abrasive surface is made to spin, like a wheel while the fiber is moved by hand in a regular motion such as a "figure 8", or is driven in slow orbital motion, to change the angle at which the abrasive moves across the end of the fiber (the "angle of attack") to attempt to provide a uniform finish.

In the case of single mode optical fibers, as used in telecommunications, the principal signal energy is guided within a glass core of e.g. five to ten micron diameter. This core is surrounded by a relatively thick clad, so that the typical outer diameter of the fiber is 125 micron diameter. It is desirable to impart a convex surface to the ends of such fibers and to press their ends together at the connection. Polishing techniques known to date have failed to produce high manufacturing yield of low loss connections and have been time consuming and costly.

SUMMARY OF THE INVENTION

According to one aspect, the invention features a method and apparatus for polishing the end of an optical fiber by producing relative lateral movement between the end of the fiber and an abrasive surface while changing the angle of attack of the relative movement at a rate greater than about 10,000 arc degrees per second.

In various aspects, the invention may include the following:

The rate of change of the angle of attack is substantially constant. The angle of attack is progressively, repeatedly changed through all angles of a circle. The relative movement is orbital. The relative movement is in the pattern of a figure 8. The abrasive surface is defined by abrasive particles having a grit size in the range of about 0.1 to 30 micron. The rate of change is greater than about 20,000 arc degrees per second. The rate of change is between about 40,000 to 150,000 arc degrees per second. The average relative speed between the end of the fiber and the abrasive surface is greater than about 250 mm/sec. The average relative speed between the end of the fiber and the abrasive surface is greater than about 500 mm/sec. The average relative speed between the end of the fiber and the abrasive surface is between about 500 mm/sec and 3000 mm/sec. The abrasive surface is moved to produce peak to peak excursions of the abrasive surface from a reference point fixed in space of less than about 5 mm but at least ten times larger than the diameter of the core of the fiber being polished.

The lateral movement is produced by providing, between the fiber and the abrasive surface, a first relative motion that provides the high rate of change of angle of attack and a second relative motion at a slow velocity in relation to the first motion that changes the general location of the end of the fiber on the abrasive surface as the polishing proceeds. The first motion is produced by moving the abrasive surface relative to a reference point fixed in space and the second motion is provided by moving the end of the fiber relative to a reference point fixed in space. The first and second motions are produced by superimposed motions of the abrasive surface relative to a reference point fixed in space.

The abrasive surface is driven in X and Y directions by respective linear actuators. The peak to peak excursions of movement of the abrasive surface in the X and Y directions relative to a reference point fixed in space are between about 0.5 and 4 mm.

The abrasive surface is driven in an orbital motion of limited diameter. The orbital motion is of diameter in the range between about 0.5 and 4 mm. The abrasive surface is driven in a figure 8 pattern of limited size. The abrasive surface is of rectangular form and the fiber is moved in a pattern of rectilinear motions over the surface to efficiently use the area of the surface.

The abrasive surface is defined by a sheet-form abrasive member resiliently supported by an elastomeric member, and the end of the fiber is pressed end-wise against the surface sufficiently to indent the sheet form member and the elastomeric member, to form a substantially convex surface on the end of the fiber.

A means is provided to move the polishing abrasive surface to drive the surface in X and Y directions. The means comprises respective X and Y linear actuators driven by a controller pre programmed to produce a predetermined pattern of motion. The means to move the polishing abrasive surface comprises an orbital drive means. The orbital drive means comprises a rotary drive motor having a drive shaft and an eccentric drive connection between the drive shaft and the abrasive surface.

A means is provided to move the fiber relatively over the abrasive surface at a relatively slow velocity to change the location of said end of the fiber on said abrasive surface as polishing proceeds. The mean to move the fiber over the abrasive surface comprises a fiber holder and means to move the holder in X and Y directions. The means to move the fiber over the abrasive surface comprises a fiber holder and an orbital drive means to move the holder in orbital motion over the abrasive surface.

A series of abrasive surfaces with decreasing grit size is used, a first grit size being of the order of 30 micron particle size, the final grit size being of the order of 0.1 micron particle size.

The optical fiber is, for example, a single mode fiber having a core diameter of about 5 to 10 microns, a multimode fiber having a core diameter of up to about 200 microns, or a power delivery fiber having a core diameter up to about 1 mm. The fiber may also be plastic or a composite.

DESCRIPTION OF PREFERRED EMBODIMENTS

We first briefly describe the drawings.

DRAWINGS

FIG. 1 is a perspective illustration of an embodiment of a fiber optic polisher according to the invention, while

Figure 7:
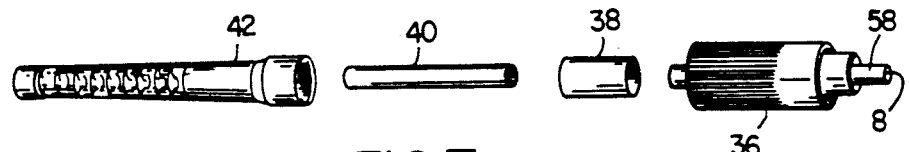
Figure 7A:
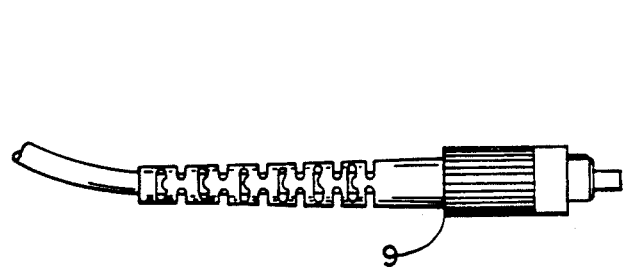
Figure 7B:
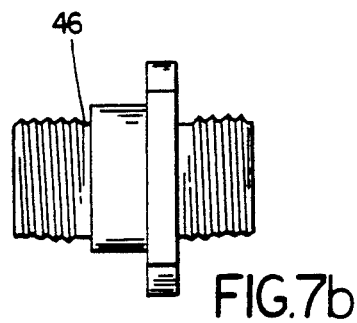
Figure 7C:
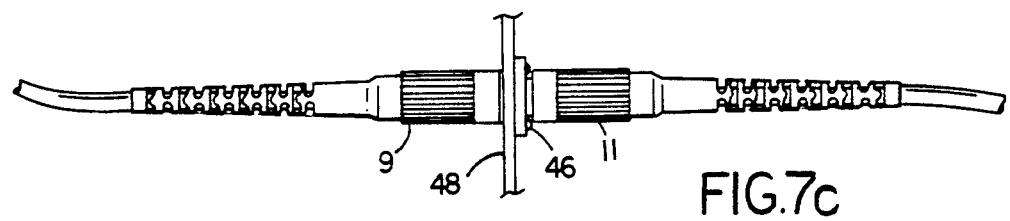

FIG. 7 is an expanded view of a connector for the end of a fiber; FIG. 7a shows the assembled connector of FIG. 7; FIG. 7b shows a receptacle for the assembled connector and FIG. 7c shows two connectors held in connecting relationship by the receptacle.

Figure 8A:
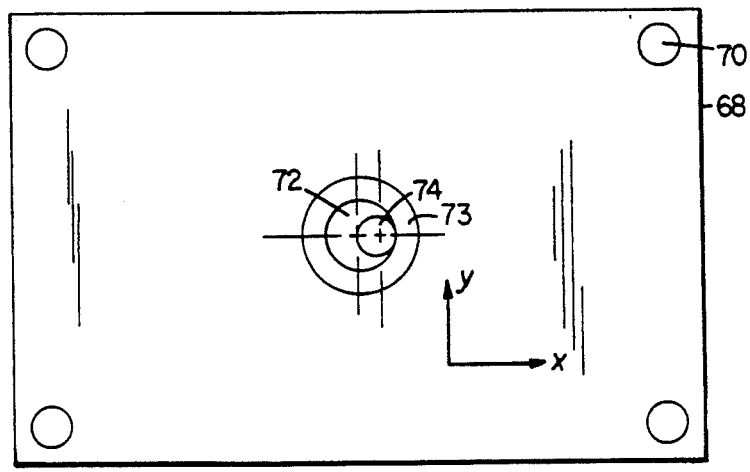
Figure 8:
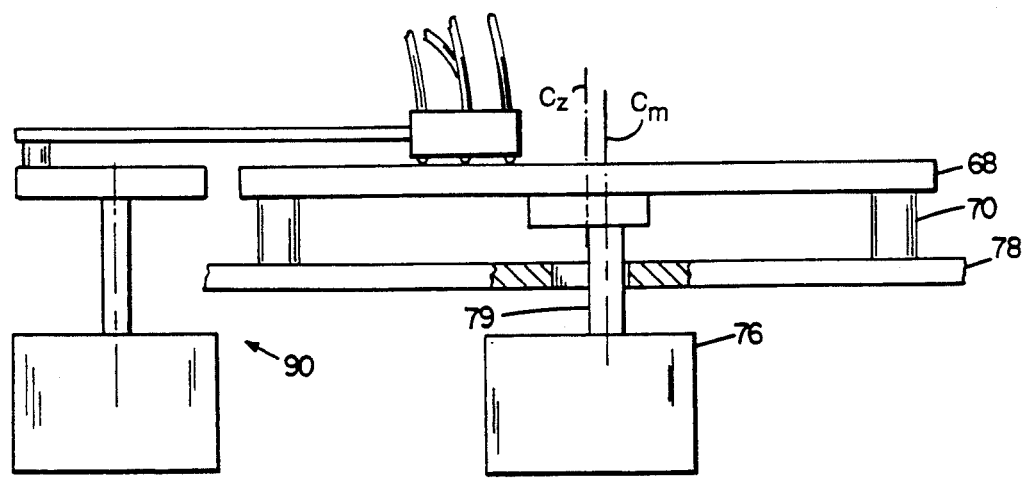

FIGS. 8 and 8a are side and plan views, respectively, of an embodiment of a polisher system employing orbital drives for the abrasive surface and the fiber.

Figure 9:
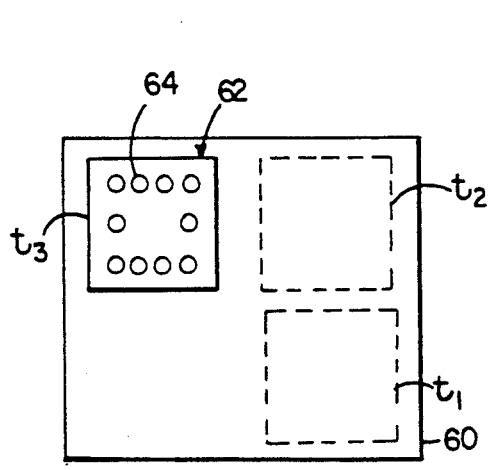
Figure 9A:
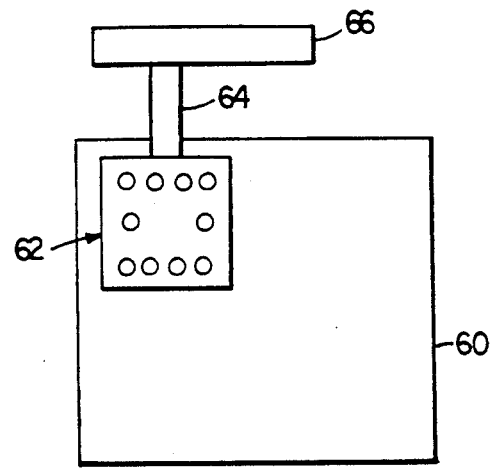

FIGS. 9-9a illustrates polishing at different regions of an abrasive and the use of an alternative fiber and connector holder and abrasive geometry.

Figure 10:
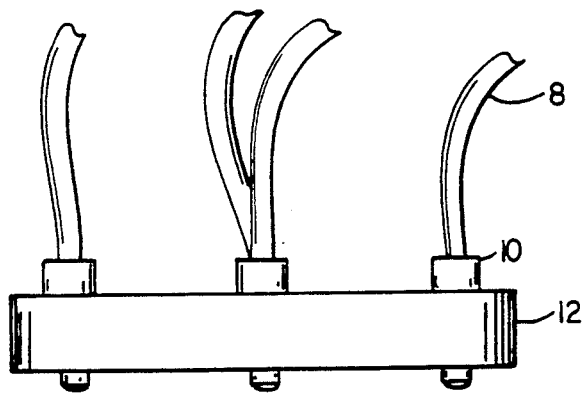
Figure 10A:
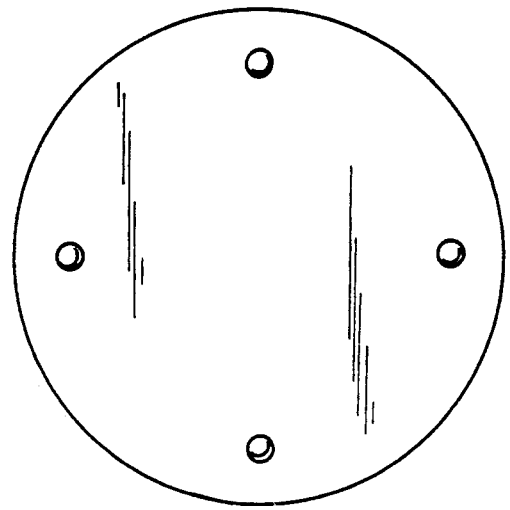

FIGS. 10 and 10a illustrates a jig for simultaneous polishing of a plurality of fibers.

STRUCTURE

Figure 1:
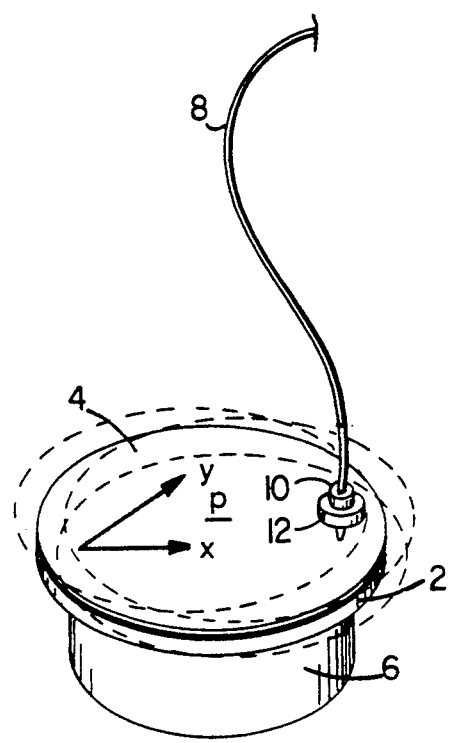
Figure 1A:
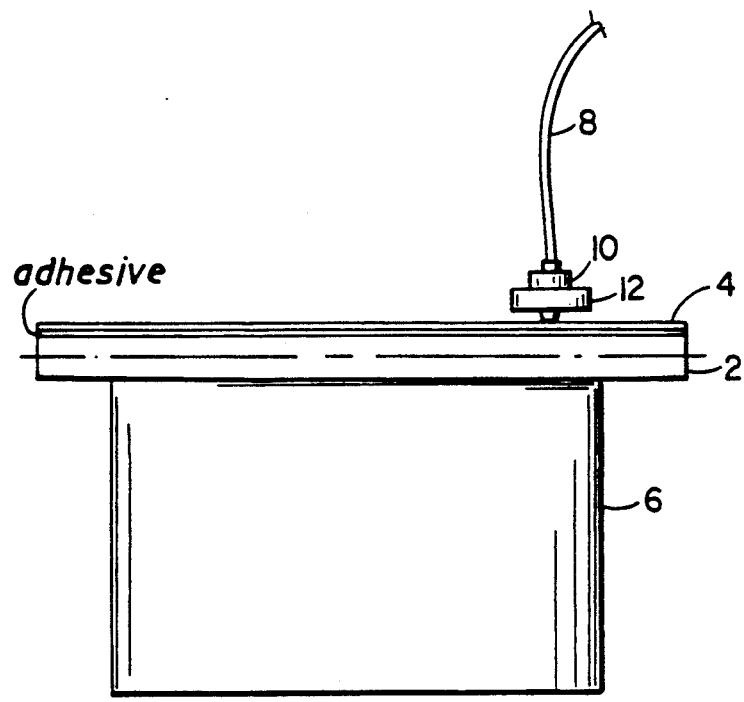
FIG. 1a is a side view of the polisher of FIG. 1.

FIGS. 1 and 1a are perspective and side views of a polishing mechanism according to the invention. Polishing table 2 has a surface to which is secured, for example, with epoxy, a polishing film 4 and underneath is a mechanism 6 to translate the table 2. The end of an optical fiber 8 and the nose of the fiber connector 10 is held against the polishing film 4 with a polishing jig or holder 12. The mechanism 6 moves the table in plane P (of the polishing cell) causing relative motion to occur between the connector with the fiber and the polishing film to frictionally polish both the connector and fiber. The relative motion, as provided according to the invention, changes the angle of attack (the direction of the relative motion with respect to an arbitrary point on the fiber end) at a rate of greater than about 10,000 arc degrees per second to produce, a fine, uniform finish that minimizes coupling losses. As illustrated in FIG. 1, the motion of the table may be orbital, i.e., the abrasive surface is caused to process around an axis in relatively tight (e.g., 0.5 to 4 mm) orbits so that the angle of the attack changes smoothly and continuously as a function of time.

We have discovered that for high rates of changing angle of attack, highly polished optical fibers having improved performance can be produced and when accompanied by high average abrasive speed, these fibers can be produced in very short time. For example, driving the abrasive surface in an orbital motion of approximately 2 mm in diameter, at 12,000 rpm, with the fiber and connectors held using a conventional connector holder and varying the position of the fiber on the abrasive surface, a surface quality has been achieved that improved the performance of the connector by 20 to 25% over conventional polishing, in considerably less time.

Figure 2:
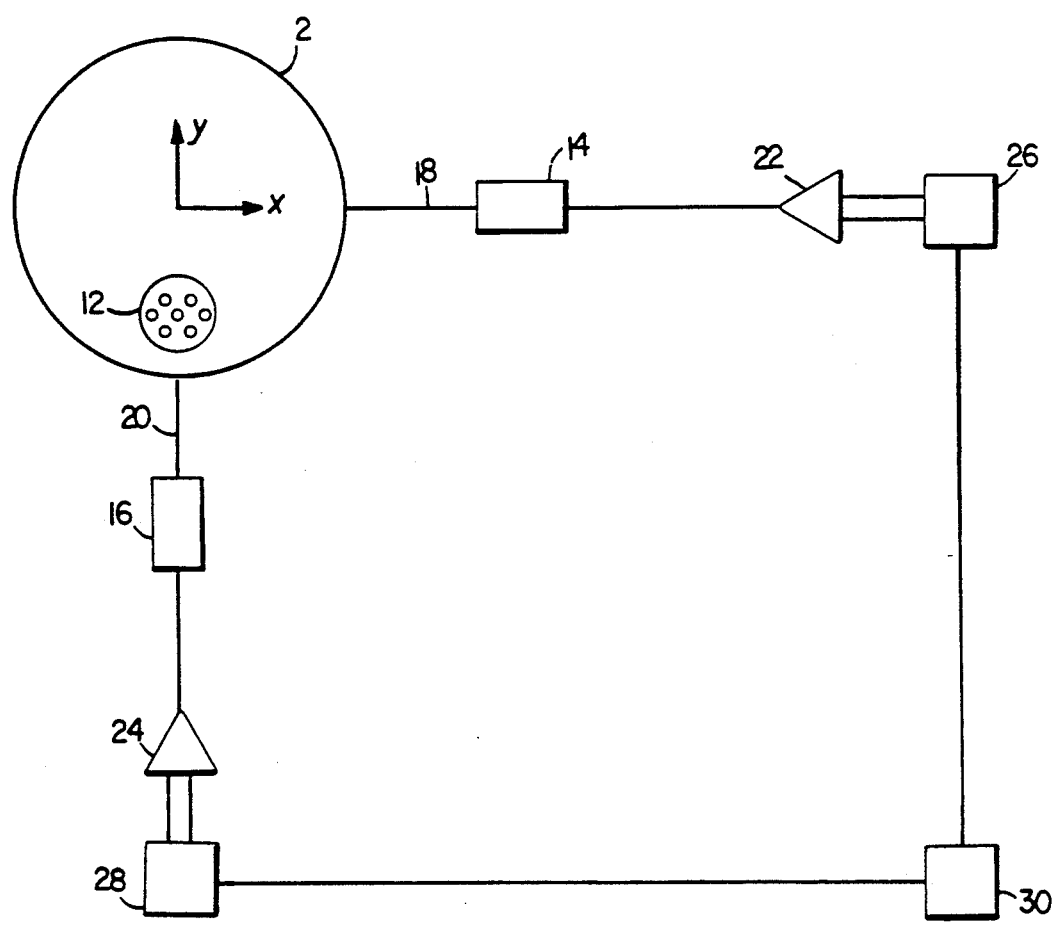
FIG. 2 is a schematic of a polisher system according to the invention.

Referring now to FIG. 2, a system is illustrated for movement of the table 2. Table 2 is mounted on x,y flexures and is connected through an x linkage 18 to x direction linear actuator 14 and through a y linkage 20 to y direction linear actuator 16 that move table 2 in the x and y direction, respectively, with respect to an arbitrary xy coordinate system in the plane of the table with its origin at the center, as shown. The actuators 14, 16, which can be, for example, mechanical or electrical, are driven by an x function generator 26 and y function generator 28 respectively that apply signals, amplified by the amplifiers 22, 24, to change the position, velocity and acceleration of the linear actuators and in turn the table 2.

The two function generators are controlled by controller 30 in a synchronized way to produce a desired table motion. For example, if x function generator 26 provides a drive signal $X = A \sin\omega t$ (where A is a constant related to the amplitude of motion, t is time and $\omega$ is angular frequency) and the y function generator provides a drive signal $y = A \cos\omega t$, the table moves in an orbital motion around the center of the table. Every point on the table 2 therefore moves in an identical orbit and the angle of attack can change smoothly and continuously. The fiber can be placed anywhere on the surface so that the entire polishing film can be utilized.

Typically the diameter of the orbital excursions range from 0.5 mm up to of about 4 mm. Below e.g., 0.5 mm, the linear speed of the particles of the film dimish to a point that the polishing action may be insufficient. Above 4 mm, the amount of horse power that is needed to orbit the plate and the amount of vibration may increase beyond desirable limits. This linear speed is a function of orbit diameter and orbit speed. Specifically:

$$\text{linear speed} = \pi d \omega$$

where d is the diameter of the orbit and $\omega$ is the orbital frequency in orbits per second. Typically the linear speed is best above 250 mm per second to achieve the benefit of reduced processing time due to higher linear speeds but below 3000 mm per second for achieving adequate life of currently available polishing films. Practical implications are that higher orbital speeds require smaller orbit diameters. The rate of the change of the angle of attack is established by the orbit speed which can be variable between about 1800 to 25,000 orbits per minute (corresponding to 10,000 to 150,000 degrees per second change in angle of attack).

The fiber connector holder 12 is placed against the polishing film and is also moved, but relatively slowly. For example, the motion of the connector holder can be orbital or a "figure 8". Typically, especially at the high rates of change in angle of attack and high speed as contemplated herein, the connectors must be exposed to different portions of the abrasive film to avoid the generation of excessive heat that might destroy the adhesive holding the grinding material onto the film or even the film itself. Generally, the rotational speed of the orbit of the holder 12 is much lower than the rotational speed of the abrasive surface drive motor. For instance, the orbiting speed of holder 12 may be 1/10 to 1 orbit per second. The orbit diameter may be set by either the motion of an operator manually moving the connector holder 12 or a pre-prescribed motion of a separate mechanical actuator, which may be an eccentric drive or a coordinated set of x-y linear actuators.

Figure 3:
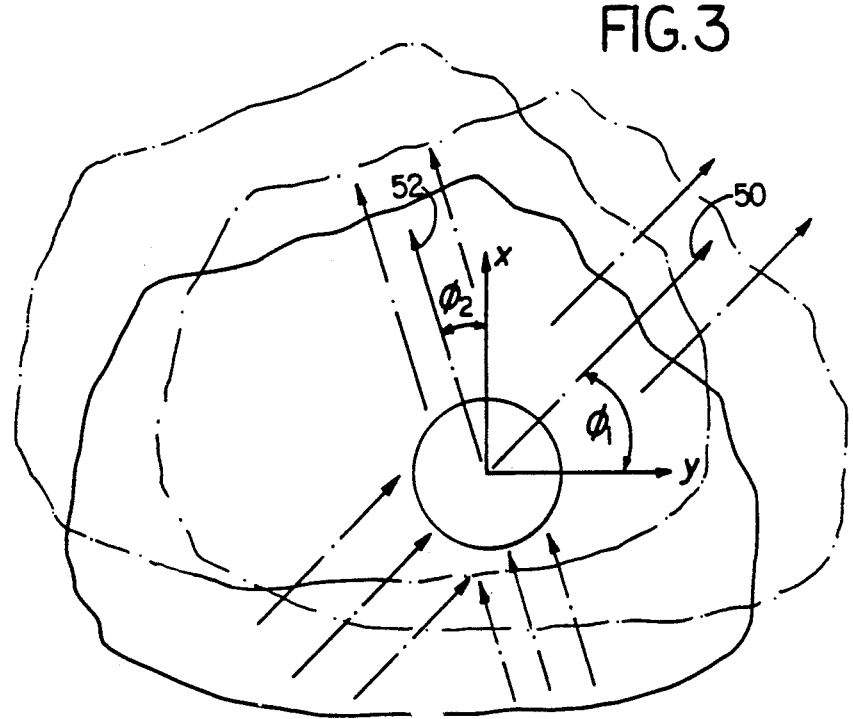
FIG. 3 illustrates the changing angle of attack of an abrasive film on a fiber.

Referring now to FIG. 3, a change of angle of attack is illustrated for the high speed orbital motion of the abrasive surface. The nose of the connector 10 and the fiber 8 can be regarded as end on looking down the axis 14 of the fiber. An arbitrary coordinate system is shown with its origin at the fiber axis. At a first instant $t_1$ the table 2 moves along the motion line 50 having an angle of $\phi_1$ with respect to the x-y coordinate system. At that instant all of the fine grains of the abrasive surface move in that direction relative to the end of the fiber. At instant $t_2$ shortly following $t_1$ the table moves in a different direction along the lines of motion 52 with a different angle $\phi_2$ with respect to the coordinate system. The change in attack angle between $t_1$ and $t_2$ is $\Delta\phi = \phi_2 - \phi_1$.

Figure 4:
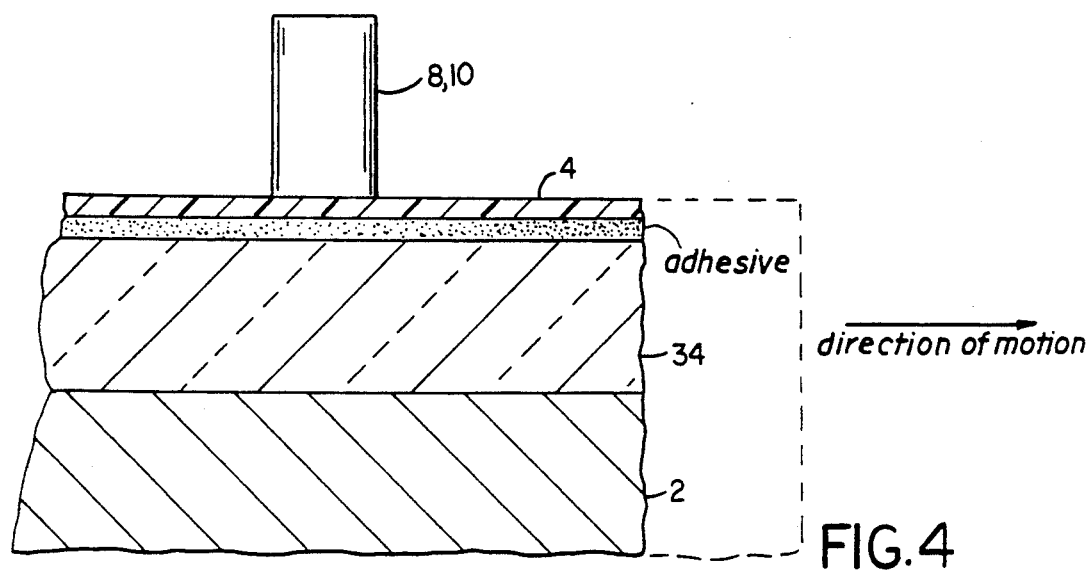
FIG. 4 illustrates polishing a fiber to form a flat, planar end.

Referring now to FIG. 4, formation of a flat end finish on an optical fiber is illustrated. Table 2 is provided with a rigid, flat plate 34 moving in accordance with motion as prescribed by the system in FIG. 1. The flat plate has a polishing film 4 against which a fiber connector is held. As the film moves, it rubs against the front surface of the fiber and connector nose at a high rate of angular change and at a high rate of speed to produce a substantially planar flat ended fiber and connector.

It will be understood that the polishing is achieved, as in the prior art, by using a series of different grade abrasives, starting with more coarse (which perform a grinding operation where substantial amounts of material, often measurable amounts of material, may be removed from the fiber end), and ending with finer (which perform polishing where less material may be removed), with abrasive particles chosen over the range of about 30 to 0.1 micron. However, using the invention, fewer steps may be required, and the finish achieved at each step can be finer than that achievable with the conventional methods of the prior art which use relatively low speeds and low angular change.

Figure 5:
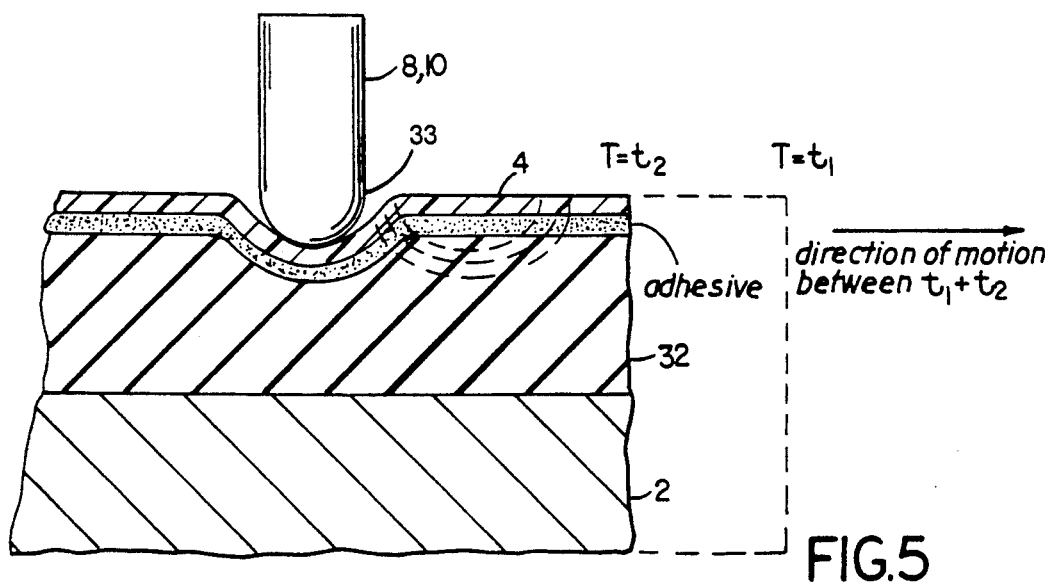
FIG. 5 illustrates polishing a fiber to form a convex end.

Referring now to FIG. 5, formation of a convex connector and fiber nose is shown. Table 2 in this case is provided with an elastomeric rubber pad 32 that has a typical Shore D durometer value from 10 to 100, typically 40. On top of the rubber pad, polishing film 4 is placed. By applying pressure to the fiber holder 12 the fiber connector indents the rubber pad and polishing film forming a dimple. As the rubber pad and polishing film move, the dimple progresses across the pad/film assembly. As the angle of attack rapidly changes, uniform polishing occurs from all sides of the periphery 33 of the connector to form uniform convex surfaces. In particular it has been found that the convex surface becomes very accurately centered on the axis of the fiber and connector. This desirable property is attributed to the rapidly changing angle of attack that assures that every portion of the periphery of the fiber equally contacts the abrasive surface. As the angle of attack experienced by the fiber changes, the portion of the periphery that compresses the elastomer and abrasive to form the dimple changes. That portion of the periphery at any instant that performs this compression is subjected to the preferentially agressive abrasive action caused by the additional force of the abrasive against the periphery. We believe that since every point on the periphery is subject to this compression action in a uniform and fast changing way, but the center of the fiber experiences no such compression, it is assured that the highest point in the curve is located at the center, i.e., the convex surface becomes automatically well centered on the fiber axis.

Figure 6:
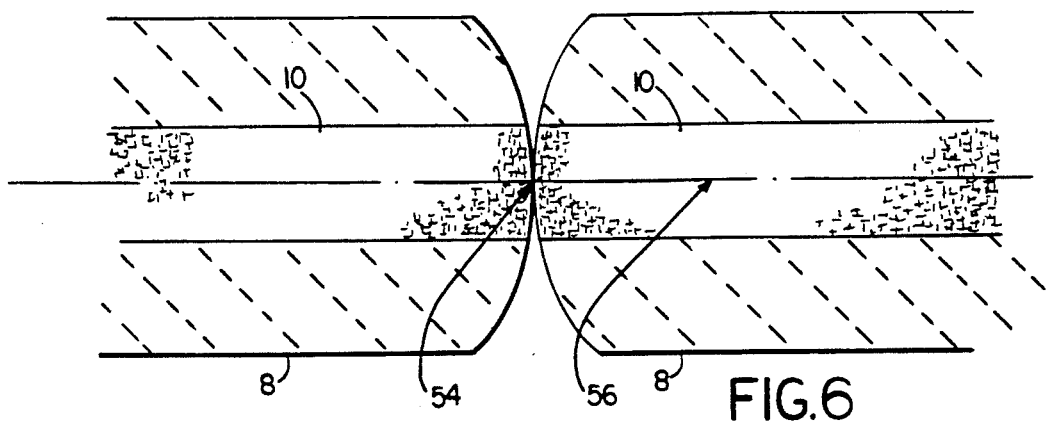
FIG. 6 illustrates the coupling of fibers having convex ends before pressure is applied between the fibers.

Referring now to FIG. 6, the noses of two fibers in connectors having their convex surfaces butting up against each other in a coupled connection is illustrated. The convex surface of the nose of the fiber has a radius of curvature much larger than that of the fiber itself. For ideal optical transmission, the center line 56 of the core of the fibers must be aligned and the highest point on the convex surface must be the true optical center of the fiber, a relationship which can be closely approached by employing the invention. It will be understood that in use the fibers of FIG. 6 are pressed end wise together causing sufficient elastic deformation of the fibers that the core portions of the fiber ends flatten into contact for essentially reflection free transmission.

Referring now to FIGS. 7-7c a conventional connection system for optical fibers produced by the invention is illustrated. The connector has a main connector body 36, inside of which is a neural nut (internal thread) to screw the connector onto a correspondingly threaded male member. The nose 58 of the connector, which protrudes out of the body can be made of any of a number of materials, including ceramics, stainless steels, or composites. In the center of this nose a small hole is provided into which the optical fiber 8 is secured. Behind the fiber optic connector, a ferrule is provided with a spring which loads the fiber in what is called a "splice bushing", pushing it outward so that a pair of fibers meeting end to end are held together under axial pressure. A shell which the spring pushes against and the neural nut holds the assembly together. The connector back shell components 38, 40 and 42 strain relieve the fiber (or a cable in which the fiber is inserted) for durability in the field.

An assembled connector assembly 8 and a coupling bushing 46 (shown blown up in size) consists of two threaded sections into which optical fiber connectors 9,11 are inserted and screwed on (FIGS. 7a and 7b). The noses of those connectors butt together on the inside of the bushing 47, and the bushing is attached to a panel 48 for mounting (FIG. 7c).

EXAMPLE 1

The following conditions were used to polish a glass fiber and connector according to the invention. The processing time and fiber quality were compared to fibers polished with a conventional Siekoh Giken Model SFP-500 Convex polisher operated at 100 RPM (as described in Siekoh Giken "Operation and Maintenance Manual", p. 3) with the following series of grit sizes: 40, 15, 9, 3, 0.5 micron. Connectors with fibers were polished according to the invention by moving the table in an orbital motion at 12,000 orbits per minute with an orbital diameter of about 2.5 mm. The fibers connectors were polished in order with film having 15 micron grit, 6 micron grit, 3 micron grit and 0.5 micron grit. A rubber backing pad with a durometer of around 40 Shore D was used on the polishing table. During processing the connectors were visually judged by an experienced technician to determine an adequate time on each polishing film. The time on each of the film media was reduced by anywhere from 2 to 10 times compared to times with the conventional method. The total processing time was about three minutes when operated according to the invention, whereas the standard method takes approximately 15 to 20 minutes. Insertion loss of fibers produced according to the invention was in the range of 0.3 to 0.4 dB with the standard deviation of 0.05 to 0.10 dB. For the conventional method, an average insertion loss of 0.5 dB with a standard deviation as high as 0.2 dB is typical. The average back reflection for fibers produced according to the invention was in the −45 to −47 dB range, and the standard deviation was about a 0.5 to 1.0 dB. By standard method, a 40 to 42 dB back reflection with a standard deviation of as high as two or three dB is typical. None of the 32 connectors processed required rework when the process according to the invention was used. In the standard process between 40 and 60 percent of the fiber ends typically require rework in order to polish a batch of devices to specification. The new process, therefore showed significant improvement in performance, uniformity, reduced time of manufacture, increased yields, and reduced rework.

FURTHER EMBODIMENTS

Referring now to FIGS. 8 and 8a, another embodiment of a polishing apparatus is shown having a table 68 mounted to a plate 78 through (typically three or four) rubber mounts 70. The rubber mounts, because of their elasticity, allow the plate to move in the X and Y directions rather freely but restrict motion in the z direction (perpendicular to the plane of the plate). At the center of the plate is a recess 72 for a bearing 73 (FIG. 8a). Inside of the bearing 73 is cam 74 offset from the center line of the table center to enable eccentric drive. A motor 76 is connected to the bearing 73 via motor shaft 79. As the motor rotates, the center line $C_z$ of the table orbits around the center line of the motor $C_m$. The diameter of the orbit produced is equal to twice the offset between the two center lines. The range of excursion is limited to the elasticity of the rubber and the height of the rubber mount.

In this embodiment, motor 76 may operate at 12,000 orbits per minute to produce 72,000 arc degrees change in attack angle per second. The fiber is also driven orbitally by eccentric drive 90, as shown in this embodiment, at a slow rate, e.g., 60 orbits per minute, having negligible effect on attack angle but assuring continual repositioning of the fiber to cool portions of the abrasive surface. In this embodiment, the orbits per minute correspond to the motor rotational speed (RPM). A variable speed motor capable of attaining the high speeds contemplated herein may also be used.

Refer now to FIG. 9, because every particle of the grinding material is moving in the same motion, (identical speeds etc,) various table and holder geometries are possible. For example, a square table 60, and a square connector holder 62, with a number of fiber optic connector positions 64 can be used. As some time $T=t_1$ the holder is positioned at the lower right hand corner of the table. At $T=t_2$, the holder is moved to the upper right corner. At $T=t_3$, the holder is shifted to the upper left corner. The entire surface of the abrasive can thus be utilized.

Referring now to FIG. 9a, the table 60 and the connector holder 62 may be attached to an arm 64 and controlled by an X-Y actuator mechanism similar to that which controls the movement of the connector holder 62 across the face of the table 60. The velocity of motion of the connector holder 62 is typically substantially lower than the velocity of motion of the surface of the film and either can be circular, rectilinear or other appropriate motion.

Referring now to FIGS. 10–10a, a connector holding device 12 is shown with a number of connectors and fibers. The nose of the connector 58 inserts through a hole in the holder 12 and attaches (e.g. by screwing the neural nut 36) into a threaded receptacle to physically hold the connector and the holder together tightly so that pressure can be applied between the connector nose and the polishing media. As shown in FIG. 10, coming off the back of the jig are the fibers themselves, which may go back to a large immobile reel of cable, making it difficult to move the connector holding device at very high speeds.

It will also be understood that other table motions can be generated. For example, for a "figure 8", one function generator of the x,y drive is driven at twice the frequency of the other function generator. In this latter motion not only the angle of attack varies rapidly, but also continuously reverses direction. Still other motions are possible by the proper selection of amplifiers, function generators and controllers, for example, elliptical, triangular, and random motions are also possible. The excursion of motion and the frequency of the motion are a function of the horse power of the amplifier and the power of the actuators.

In one embodiment both the high rate of change of angle of attack motion, and the relatively slow translation or orbital motion to expose fresh abrasive surface can be achieved by preprogramming means that provide and add together two respective drive signals. The resultant signal, which effectively represents a superposition of the two drive motions, is applied to the x,y actuators to achieve the desired composite motion.

Alternatively, a pair of tables can be provided each with a system for providing motion in the x,y directions. The first table may be provided with an abrasive and operated as described to provide rapid changing angle of attack and rapid speed for polishing the fiber. The second table carries the first and is operated to provide a relatively slow motion to move the first table in such a way that the fiber is exposed to cool portions of the abrasive as the first table causes the polishing action.

Additionally, polishing according to the invention is applicable to optical fibers formed of materials other than glass and of various dimensions. For example, multimode fibers of the type used for data communications in computers, local area networks and low rate telephone communications can also be polished as discussed above. Typically, these multimode fibers have core diameters up to 200 μm. Likewise, specialty fibers of the type used in sensors or power transmission such as laser light transmission may also be polished as described herein. Some specialty fibers have core diameters up to 1 mm. For high power laser transmission, a highly polished fiber end is desirable to avoid heating of the end by the transmitted radiation. Other optical fibers are also known and can be polished according to the invention. These include plastic fibers, ceramic fibers such as lithium niobate, and composite fibers such as plastic and glass fibers.

It will also be understood that portable polishing units are possible.

Other embodiments are within the claims.

I claim:

1. A method of polishing the end of an optical fiber comprising producing relative lateral movement between the end of the fiber and an abrasive surface disposed in a generally perpendicular relationship to the axis of the fiber, said relative lateral movement being produced in a continuous, curved pattern in the manner that the direction of said relative movement between the end of the optical fiber and the abrasive surface continuously changes at a rate greater than about 10,000 arc degrees per second.

2. The method of claim 1 in which said rate of change of said direction of relative movement is substantially constant.

3. The method of claim 1 in which said direction of relative movement is progressively, repeatedly changed through all angles of a circuit.

4. The method of claim 3 in which the relative movement is orbital.

5. The method of claim 3 in which the movement is in the pattern of a figure 8.

6. The method of claim 1 wherein said abrasive surface is defined by abrasive particles having a grit size in the range of about 0.1 to 30 microns.

7. The method of claim 1 wherein said rate of change is greater than about 20,000 arc degrees per second.

8. The method of claim 1 wherein said rate of change is between about 40,000 to 150,000 arc degrees per second.

9. The method of claim 1 wherein the average relative speed between the end of said fiber and said abrasive surface is greater than about 250 mm/sec.

10. The method of claim 1 wherein the average relative speed between the end of said fiber and said abrasive surface is greater than about 500 mm/sec.

11. The method of claim 1 wherein the average relative speed between the end of said fiber and said abrasive surface is between about 500 mm/sec and 3000 mm/sec.

12. The method of claim 1 in which said relative movement produces relative excursions of said abrasive surface relative to said fiber being polished of less than about 5 mm but at least ten times larger than the diameter of the core of said fiber.

13. The method of claim 1 wherein said relative lateral movement is produced by providing, between said fiber and said abrasive surface, a first relative motion that provides said continuous high rate of change of said direction and a second relative motion that changes the general location of said end of said fiber on said abrasive surface as said polishing proceeds.

14. The method of claim 13 including producing said first motion by moving said abrasive surface relative to a reference point fixed in space and producing said second motion by moving said end of said fiber relative to said reference point.

15. The method of claim 13 wherein said first and second motions are produced by superimposed motions of said abrasive surface relative to a reference point fixed in space, said fiber being fixed in space.

16. The method of claim 1 in which said abrasive surface is continuously driven in both X and Y directions by respective linear actuators.

17. The method of claim 16 wherein the peak to peak excursions of movement of said abrasive surface in each of the X and Y directions relative to a reference point fixed in space are between about 0.5 and 4 mm.

18. The method of any one of claims 13, 14 or 16 in which said abrasive surface is driven in an orbital motion of limited diameter.

19. The method of claim 18 in which said orbital motion is of diameter in the range between about 0.5 and 4 mm.

20. The method of any one of claims 13, 14 or 16 in which said abrasive surface is driven in a figure 8 pattern of limited size.

21. The method of claim 13 or 14 wherein said abrasive surface is of rectangular form and said fiber is moved relative to said abrasive surface in said second, slow velocity in a pattern of rectilinear form over said abrasive surface to efficiently use the area of said surface.

22. The method of claim 13 wherein said abrasive surface is defined by a sheet-form abrasive member resiliently supported by an elastomeric member, and pressing the end of said fiber end-wise against said surface sufficiently to indent said sheet-form member and said elastomeric member, to form a substantially convex end on the fiber.

23. An optical fiber having a polished end produced by the method of any of the claims 1, 2 or 3.

24. The optical fiber of claim 23 wherein said optical fiber is a glass single mode fiber having a diameter of 5 to 10 microns.

25. The optical fiber of claim 23 wherein said optical fiber is a multimode fiber having a core diameter up to about 200 mm.

26. The fiber of claim 23 wherein said fiber is a power delivery fiber having a diameter up to 1 mm.

27. The fiber of claim 23 wherein said fiber is formed of plastic.

28. The fiber of claim 23 wherein said fiber is a composite.

29. A method of polishing the end of a glass optical fiber comprising producing relative lateral movement between the end of the fiber and an abrasive surface disposed in a generally perpendicular relationship to the axis of the fiber, said relative lateral movement being produced in a continuous, curved pattern in the manner that the direction of said relative movement between the end of the optical fiber and the abrasive surface continuously changes at a rate greater than about 10,000 arc degrees per second, wherein said fiber is a single mode telecommunication fiber having a core diameter of about 5 to 10 microns, in which said rate of change of the direction of relative movement is substantially constant, the average relative speed between the end of said fiber and said abrasive surface is greater than about 250 mm/sec., said lateral movement is produced by providing, between said fiber and said abrasive surface, a first relative motion that provides said high rate of change of said direction of relative movement and a second relative motion at a slow velocity in relation to said first motion that changes the general location of said end of said fiber on said abrasive surface as said polishing proceeds.

30. The method of claim 29 wherein said abrasive surface is defined by a sheet-form abrasive member resiliently supported by an elastomeric member, and further comprising pressing the end of said fiber end-wise against said surface sufficiently to indent said sheet-form member and said elastomeric member, to form a substantially convex end on the fiber.

31. The method of claim 29 wherein a series of abrasive surfaces with decreasing grit size is used, a first grit size being of the order of 30 microns, the final grit size being of the order of 0.1 micron.

32. A telecommunications single mode fiber having a polished end produced by one of the methods of claims 29, 30 or 31.

* * * * *

UNITED STATES PATENT AND TRADEMARK OFFICE
CERTIFICATE OF CORRECTION

PATENT NO. : 5,184,433

DATED : February 9, 1993

INVENTOR(S) : Maack

It is certified that error appears in the above-indentified patent and that said Letters Patent is hereby corrected as shown below:

Column 9, line 35, claim 13, after "motion" insert --at a relatively slow velocity in relation to said first motion--.

Signed and Sealed this

Twenty-ninth Day of March, 1994

Attest:

BRUCE LEHMAN

Attesting Officer    Commissioner of Patents and Trademarks